United States Patent Office.

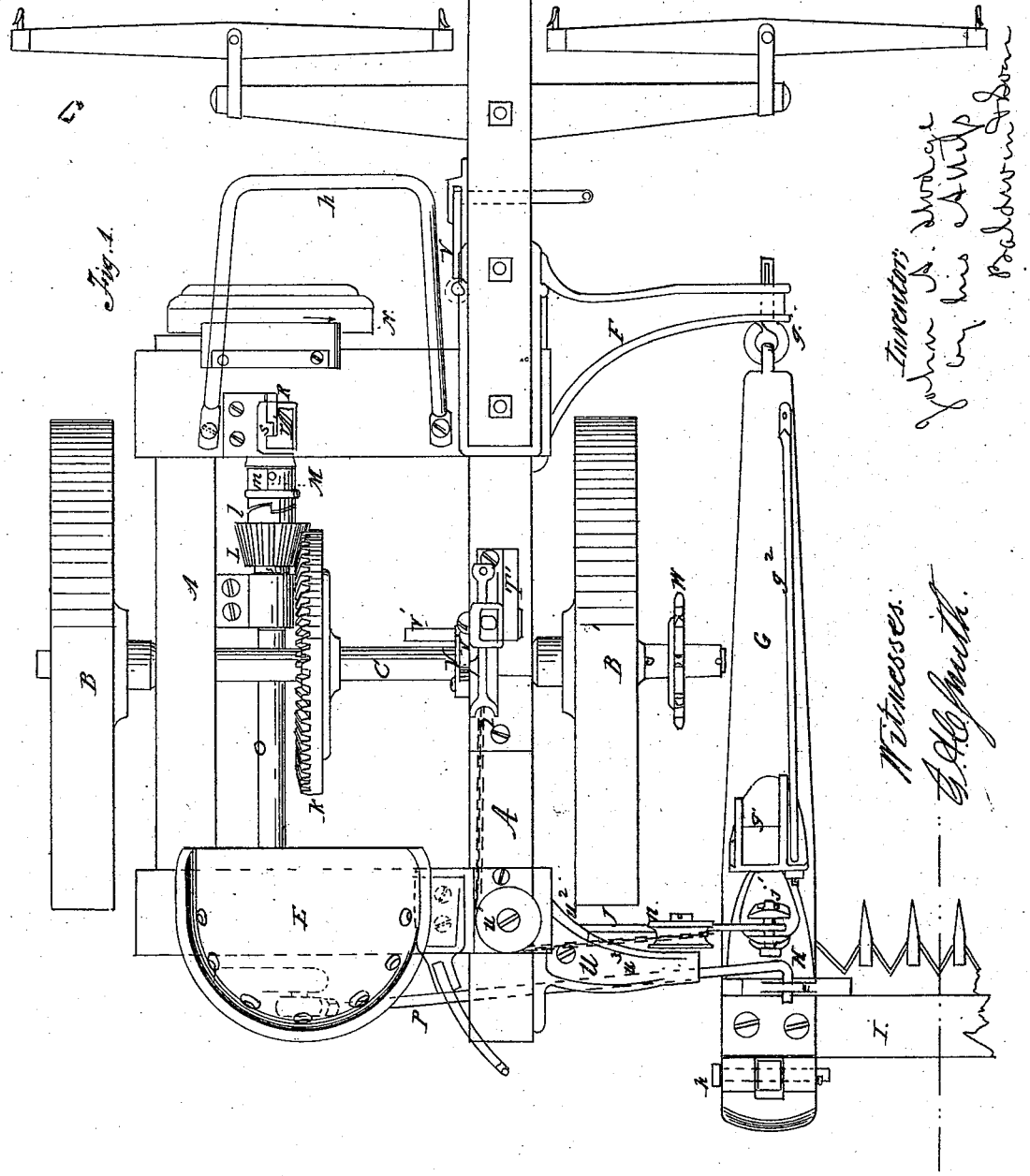

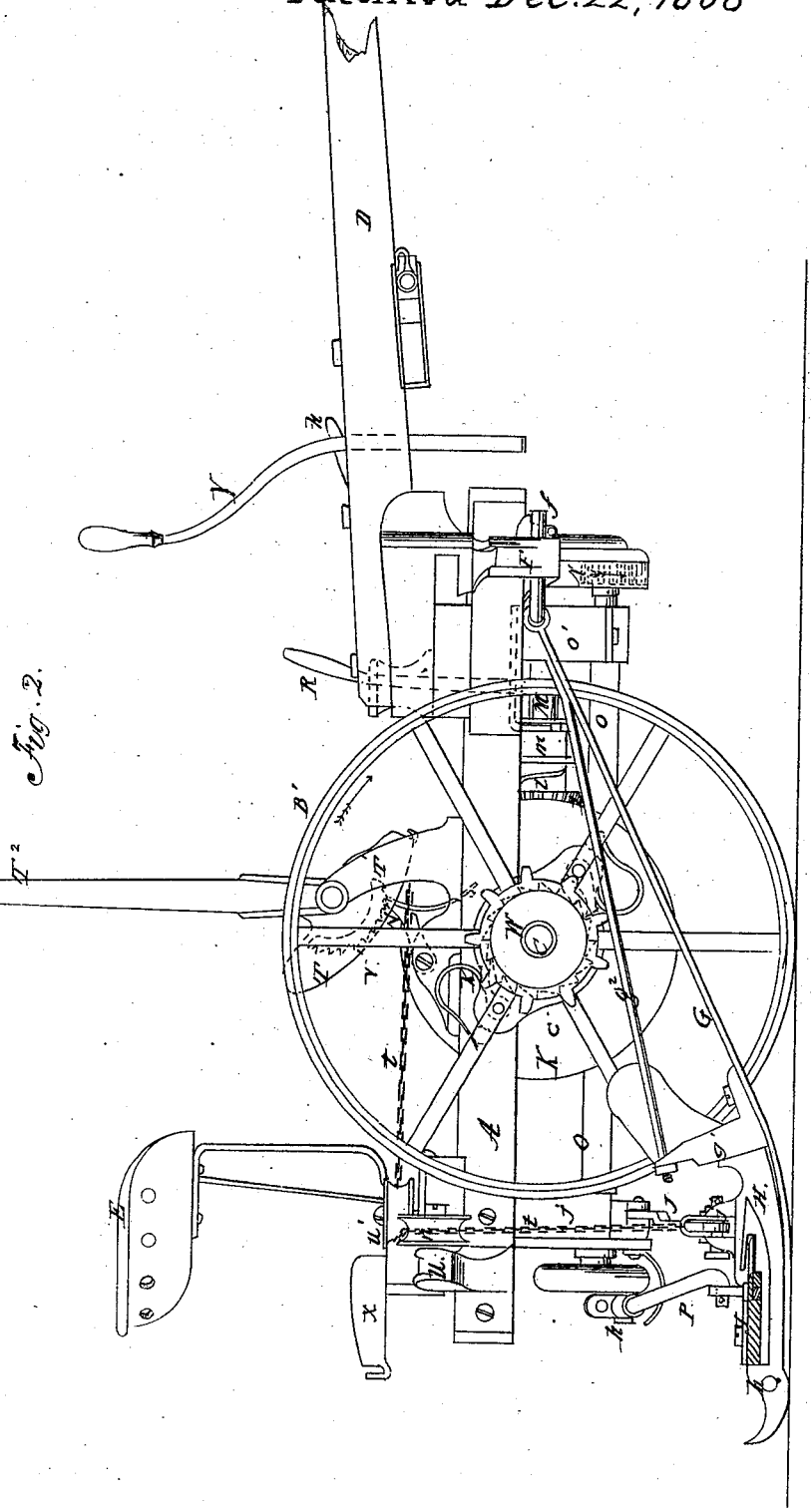

JOHN A. DODGE, OF AUBURN, NEW YORK.

Letters Patent No. 85,168, dated December 22, 1868.

---

IMPROVEMENT IN HARVESTERS.

---

The Schedule referred to in these Letters Patent and making part of the same.

---

*To all whom it may concern:*

Be it known that I, JOHN A. DODGE, of Auburn, in the county of Cayuga, and State of New York, have invented certain new and useful Improvements in Harvesters, of which the following is a full, clear, and exact description, reference being had to the accompanying drawings, which make part of this specification, and in which—

Figure 1 represents a plan or top view of my improved machine, with the platform which covers the gearing removed; and Figure 2, a view, in elevation, of the same, as seen from the divider side of the machine.

The blue lines in the drawings represent parts used in reaping only.

The improvements herein claimed consist in certain novel devices by which I secure an efficient mower, which, at the same time, is especially adapted for the attachment of reaping and raking-devices.

To carry out my invention, I mount a stout rectangular main frame, A, upon an axle, C, supported upon two driving-wheels, B B', which revolve loosely on the axle, outside the main frame, and carry spring-pawls, $b$, which engage with ratchets, $c$, secured upon and turning with the main axle, by which means the cutters are stopped when the machine is backed; but in turning, when moving forward, one wheel is always in gear, and the cutters, consequently, are kept in motion.

The machine is drawn by a tongue, D, rigidly secured to the inner front corner of the main frame, which arrangement diminishes the side-draught.

A seat, E, for the driver, is mounted on the rear end of the main frame.

An arm, F, projects from the inner front corner of the frame, and has a drag-bar, G, pivoted to it by a swivel-joint, $g$.

The finger-beam I is firmly secured to a shoe, H, hinged at its back end, to play vertically on a pivot, $h$, on the drag-bar G. The toe of this shoe is adjustable in a vertical slot, in a standard, $g^1$, on the drag-bar, and is held in any desired position by a pin passing through the standard, and into the toe of the shoe. The standard and drag-bar are braced by a tie-rod, $g^2$.

A double-hinged bar or coupling-arm, J, is pivoted, at its upper end, to a down-hanger or stirrup, $j$, attached to the main frame, and is pivoted, at its lower end, to the shoe H, by a joint, $j'$.

The finger-beam is thus left free to conform to the undulations of the ground over which it is drawn, without being vibrated longitudinally by the reciprocation of the cutters.

A bevel-wheel, K, on the main axle C, drives a corresponding pinion, L, on a horizontal counter-shaft, M, (arranged parallel to the frame-timbers,) which carries on its forward end an internal spur-wheel, N, which drives a corresponding pinion on the crank-shaft O, which turns in suitable bearings in down-hangers or stirrups, $o'$ and $j$, and runs the whole length of the main frame, and parallel to it.

The cutters are driven by a crank, $p$, and pitman, P, in the usual way. The pitman also swivels or turns axially in its bearings, to accommodate itself to the working of the finger-beam.

The pinion L, it will be observed, turns loosely on the counter-shaft, and is provided with a feather, $l$, which matches a corresponding one on a collar, $m$, which slides endwise on the counter-shaft, in front of the pinion, but is made to turn with it, by means of a pin entering a longitudinal slot in the collar, in the usual way. This collar is moved back and forth, to throw the mechanism into and out of gear, by means of a lever, R, provided with a yoke, $r$, which embraces the collar, but allows it to turn freely. This lever is in a convenient position to be moved by the foot of the driver, and is held on either side of a notched detent, S, by a spring, $r'$, according to his desire to hold the mechanism in or out of gear.

I am aware that an arrangement of gearing, somewhat similar to mine, has been employed in various machines, but in all such machines, of which I have any knowledge, the arrangement of parts is reversed, so as to bring the sliding clutch within the periphery of the bevel-wheel K.

By my arrangement, on the contrary, the clutch is outside the periphery of the bevel-wheel. This mode of construction enables me to shorten the rear end of the counter-shaft, and to arrange my disconnecting-lever on the front cross-timber, in the relation shown to the driver, and this specific construction is all I claim under this head of my invention.

The cutting-apparatus is raised or lowered by means of a cord or chain, $t$, connected to a sector-shaped rocking-lever, T, pivoted in a standard, T', to oscillate vertically, and parallel to the inner side timber of the main frame, and controlled by a handle, $T^2$, within convenient reach of the driver. The chain $t$ passes over a friction-roller, $u$, on an arm, U, projecting from the inner rear corner of the frame, and over another roller, $u^1$, on the main frame itself.

A spring-pawl, V, is pivoted to play vertically on the inner-frame timber, parallel to the sector T, and takes into a ratchet, $v$, on the inner side of this sector, to hold it, and consequently the finger-beam, at any desired elevation.

An arm, $v'$, projects inwards from the pawl V, so that the driver can, at any moment, release it from its detent, by bearing his weight on this arm.

The finger-beam may be held up, for transportation, by an irod rod pivoted to the frame, and taking into a hole in the finger-beam, in the usual way.

The gearing is protected by a platform covering the main frame. This platform is hinged at its rear end, to allow access to the gearing, and is provided with a latch at its forward end, to hold it down.

A tool-box is also mounted on this platform.

The above description applies to my machine as a mower. To convert it into a self-raking reaper, I detach the finger-beam, drag-bar, overhanging arm U, and chain t, and attach the raking-mechanism, platform, cutting-apparatus, and drag-bar, described in an application for Letters Patent of the United States, filed simultaneously with this, by John A. Dodge and George Perry.

The overhanging arm U is made in two parts, $u^2$ $u^3$, connected by a screw, (as shown in the drawings,) in order that it may be removed when reaping.

The inner end of the platform is suspended by a chain from the projecting arm X, shown in blue in the drawings.

The rake is driven by an endless chain from the sprocket-wheel W, on the projecting end of the main axle O.

The driver's seat is moved forward and bolted to the outer front corner of the platform, so as to bring it nearly over the shipping-lever R. In this position the driver rests his feet on the rail Z, and his hand is within easy reach of the lever Y, to which the chain which controls the movement of the rake is attached.

Having thus fully described my improved machine, what I claim therein as new, and desire to secure by Letters Patent, is—

1. The combination, as described, of the bevel-wheel K, on the main axle, with the bevel-pinion L, and sliding sleeve m, both mounted on the counter-shaft, and connected by a feather, the sliding sleeve being arranged outside of the periphery of the bevel-wheel, as set forth.

2. The combination of the bevel-wheel K, the bevel-pinion L, the sliding sleeve m, the counter-shaft M, and the shipping-lever R, when all these parts are constructed and arranged for joint operation, as described.

3. The combination of the bevel-wheel, the bevel-pinion, the sliding sleeve, the shipping-lever, the counter-shaft and its spur-pinion, with the internal spur-wheel N and longitudinal crank-shaft O, when all these parts are constructed and arranged for joint operation, as described.

4. The combination of the sector T and ratchet $v$ with the spring-pawl and projecting arm $v'$, constructed, arranged, and operating as described.

5. The combination of the main frame, the tongue, the driving-wheels, the gearing, the removable driver's seat, the projecting arm F, the removable arm U, the drag-bar, the coupling-arm, the finger-beam, the cutting-apparatus, and the lifting-apparatus, all constructed and arranged as described, for joint operation.

In testimony whereof, I have hereunto subscribed my name.

JOHN A. DODGE.

Witnesses:
  A. C. MUNGER,
  F. G. DAY.